United States Patent
Chernyakov et al.

(10) Patent No.: US 8,464,952 B2
(45) Date of Patent: Jun. 18, 2013

(54) OPTICAL READER HAVING IMPROVED BACK-ILLUMINATED IMAGE SENSOR

(75) Inventors: Alexey Chernyakov, Ithaca, NY (US); Daniel Van Volkinburg, Syracuse, NY (US); Brian Jovanovski, Syracuse, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 279 days.

(21) Appl. No.: 12/621,088

(22) Filed: Nov. 18, 2009

(65) Prior Publication Data
US 2011/0114728 A1    May 19, 2011

(51) Int. Cl.
G06K 7/10    (2006.01)

(52) U.S. Cl.
USPC .......................................................... 235/454

(58) Field of Classification Search
USPC ................... 235/472.01–472.03, 454, 462.11
See application file for complete search history.

(56) References Cited

U.S. PATENT DOCUMENTS

| | | | |
|---|---|---|---|
| 6,168,965 B1 | 1/2001 | Malinovich et al. | |
| 6,393,327 B1 | 5/2002 | Scribner | |
| 6,821,809 B2 | 11/2004 | Abe et al. | |
| 7,072,096 B2 | 7/2006 | Holman et al. | |
| 7,205,549 B2 | 4/2007 | Yoshida et al. | |
| 7,234,641 B2 | 6/2007 | Olmstead | |
| 7,387,252 B2 * | 6/2008 | Gannon et al. | 235/462.43 |
| 7,398,927 B2 | 7/2008 | Olmstead et al. | |
| 7,525,567 B2 | 4/2009 | McCutchen | |
| 7,527,207 B2 | 5/2009 | Acosta et al. | |
| 7,552,863 B2 | 6/2009 | Koziol et al. | |
| 7,568,628 B2 | 8/2009 | Wang et al. | |
| 7,611,060 B2 | 11/2009 | Wang et al. | |
| 7,648,851 B2 | 1/2010 | Fu et al. | |
| 7,699,227 B2 | 4/2010 | Wang et al. | |
| 7,732,299 B2 | 6/2010 | Chang et al. | |
| 7,755,685 B2 | 7/2010 | Tower et al. | |
| 7,795,650 B2 | 9/2010 | Eminoglu et al. | |
| 7,909,257 B2 | 3/2011 | Wang et al. | |
| 7,918,397 B2 | 4/2011 | Hussey | |
| 7,923,344 B2 | 4/2011 | Fu et al. | |
| 7,926,721 B2 | 4/2011 | Meier et al. | |
| 7,956,392 B2 | 6/2011 | Uya | |
| 7,967,190 B2 | 6/2011 | Hussey | |
| 7,992,784 B2 | 8/2011 | Barten | |
| 8,038,054 B2 | 10/2011 | Douma | |

(Continued)

OTHER PUBLICATIONS

Swain, P. K. et al., "Back-Illuminated Image Sensors Come o the Forefront", Photonics.com Aug. 1, 2008, hggp://www.photonics.com/Content/ReadArticle.aspx?ArticleID-34685, printed Mar. 17, 2009, pp. 1 through 3.

(Continued)

Primary Examiner — Seung Lee
(74) Attorney, Agent, or Firm — Heslin Rothenberg Farley & Mesiti P.C.

(57) ABSTRACT

An optical reading device for collecting and processing symbology data comprising: a back-illuminated image sensor for converting light reflected from an information bearing indicia (IBI) into output signals representative thereof; receive optics for directing light from the target to the back-illuminated image sensor; a processor for decoding the output signals; an illumination source for generating illumination light illuminating the target and illumination optics for directing the illumination light onto the target and a housing encompassing the back-illuminated image sensor, receive optics and illumination source adapted for hand held operation.

8 Claims, 4 Drawing Sheets

U.S. PATENT DOCUMENTS

| | | |
|---|---|---|
| 8,097,904 B2 | 1/2012 | Eminoglu et al. |
| 8,146,820 B2 | 4/2012 | Wang et al. |
| 8,186,592 B2 | 5/2012 | Fletcher |
| 8,186,597 B1 | 5/2012 | Fletcher |
| 2002/0050518 A1 | 5/2002 | Roustaei |
| 2003/0128737 A1 | 7/2003 | McGrath et al. |
| 2004/0180462 A1 | 9/2004 | Costello et al. |
| 2004/0183941 A1 | 9/2004 | McCutchen |
| 2004/0207726 A1 | 10/2004 | McCutchen |
| 2006/0072020 A1 | 4/2006 | McCutchen |
| 2006/0138322 A1 | 6/2006 | Costello et al. |
| 2006/0152931 A1 | 7/2006 | Holman |
| 2006/0214086 A1 | 9/2006 | Fukushima |
| 2006/0255240 A1 | 11/2006 | Etoh |
| 2007/0164111 A1 | 7/2007 | Wang et al. |
| 2007/0267490 A1 | 11/2007 | Jerabeck et al. |
| 2007/0267501 A1 | 11/2007 | Jovanovski et al. |
| 2008/0041954 A1 | 2/2008 | Gannon et al. |
| 2008/0063294 A1 | 3/2008 | Burt et al. |
| 2008/0093456 A1 | 4/2008 | Pasik et al. |
| 2008/0116282 A1 | 5/2008 | Sharra et al. |
| 2008/0121715 A1 | 5/2008 | Field |
| 2008/0160723 A1 | 7/2008 | Hannebauer |
| 2008/0164315 A1 | 7/2008 | Pankow |
| 2008/0217411 A1 | 9/2008 | Ledwith et al. |
| 2008/0230607 A1 | 9/2008 | Etten |
| 2008/0296393 A1 | 12/2008 | Jovanovski et al. |
| 2008/0308638 A1 | 12/2008 | Hussey |
| 2008/0314969 A1 | 12/2008 | Hussey |
| 2009/0001494 A1 | 1/2009 | Park et al. |
| 2009/0022429 A1 | 1/2009 | Longacre, Jr. et al. |
| 2009/0026508 A1 | 1/2009 | Seitz |
| 2009/0046952 A1 | 2/2009 | Ben-Ezra et al. |
| 2009/0072034 A1 | 3/2009 | Meier et al. |
| 2009/0102671 A1 | 4/2009 | Susewitt et al. |
| 2009/0121025 A1 | 5/2009 | Romanchik |
| 2009/0159684 A1 | 6/2009 | Barber et al. |
| 2009/0224345 A1 | 9/2009 | Lee et al. |
| 2009/0255994 A1 | 10/2009 | Gillespie et al. |
| 2010/0230579 A1 | 9/2010 | Watanabe |
| 2010/0238323 A1 | 9/2010 | Englund |
| 2010/0306755 A1 | 12/2010 | Fitch |
| 2010/0327388 A1 | 12/2010 | McCarten et al. |
| 2010/0327389 A1 | 12/2010 | McCarten et al. |
| 2010/0327392 A1 | 12/2010 | McCarten et al. |
| 2010/0330728 A1 | 12/2010 | McCarten et al. |
| 2011/0024808 A1 | 2/2011 | Janesick |
| 2011/0024809 A1 | 2/2011 | Janesick |
| 2011/0024810 A1 | 2/2011 | Janesick |
| 2011/0101103 A1 | 5/2011 | Sauerwein, Jr. |
| 2011/0101482 A1 | 5/2011 | Meynants |
| 2011/0114728 A1 | 5/2011 | Chernyakov et al. |
| 2011/0133061 A1 | 6/2011 | Yu et al. |
| 2011/0136288 A1 | 6/2011 | Duane et al. |
| 2011/0163166 A1 | 7/2011 | Wang et al. |
| 2011/0174881 A1 | 7/2011 | Samek et al. |
| 2011/0216212 A1 | 9/2011 | Watanabe et al. |
| 2011/0241876 A1 | 10/2011 | Kearney |
| 2011/0242376 A1 | 10/2011 | Ando |
| 2011/0259963 A1 | 10/2011 | McCall et al. |
| 2011/0261203 A1 | 10/2011 | Mupkala et al. |
| 2011/0309150 A1 | 12/2011 | Jovanovski et al. |
| 2011/0309151 A1 | 12/2011 | Cudzilo |
| 2011/0315854 A1 | 12/2011 | Janesick |
| 2012/0029764 A1 | 2/2012 | Payne et al. |
| 2012/0037960 A1 | 2/2012 | Yokoyama et al. |
| 2012/0038821 A1 | 2/2012 | Gannon |
| 2012/0048939 A1 | 3/2012 | Fiutak et al. |
| 2012/0056079 A1 | 3/2012 | Levine et al. |
| 2012/0056080 A1 | 3/2012 | Levine et al. |
| 2012/0085818 A1 | 4/2012 | Williams |
| 2012/0092531 A1 | 4/2012 | Koziol et al. |
| 2012/0104464 A1 | 5/2012 | Janesick et al. |
| 2012/0111943 A1 | 5/2012 | Meier et al. |
| 2012/0145793 A1 | 6/2012 | Kearney |

OTHER PUBLICATIONS

Author unlisted, Omnivision, (Media Contact: Martijn Pierik), "Omnivision Turns Digital Imaging World Upside Down", Sunnyvale, California, May 27, 2008, 3 pages.

Pain, Bedabrata, "A Back-Illuminated Megapixel CMOS Image Sensor", Beacon eSpace at Jet Propulsion Laboratory, found at http://trs-new.jpl.nasa.gov/dspace/handle/2014/39312, pp. 1-2, printed Mar. 11, 2009.

U.S. Appl. No. 13/523,317, filed Jun. 14, 2012.
U.S. Appl. No. 13/437,439, filed Apr. 2, 2012.
U.S. Appl. No. 13/289,798, filed Nov. 4, 2011.
U.S. Appl. No. 13/289,788, filed Nov. 4, 2011.

Park, Joon Hyuk, "Back-Illuminated Ultraviolet Image Sensor in Silico-on-Sapphire", Electrical Engineering Department, Yale University, New Haven CT 06520, 2008, 4 pages.

Author unlisted, Sony develops back-illuminated CMOS image sensor, found at http://www.dcviews.com/press/Sony-CMOS-back.htm Jun. 11, 2008, pp. 1 through 3.

Author unlisted, "New Omnivision CMOS turns digital imaging upside-down", found at http://www.dcviews,com/press/OrnniVisin-CMOS.htm, May 27, 2008, pp. 1 through 2.

Author unlisted, "Back illumination for all CCD and CMOS image sensor", Ultra-Sense™ Imager Solutions, Enhanced performance—Lower manufacturing cost—High volume, Sarnoff Corporation, 201 Washington Rd., P.O. Box 5300, Princeton, NJ 08543, website: www.sarnoff.com, 2008, pp. 1 through 2.

Author unlisted, "CCD 3041 Back-Illuminated 2K x 2K Full Frame CCD Image Sensor", Fairchild Imaging, 1801 McCarthy Blvd., Milpitas CA 95035 (website: www.fairchildimaging.com), 2008, pp. 1 through 10.

Suntharalingam, Vyshnavi et al., "Back-Illuminated Three-Dimensionally Integrated CMOS Image Sensors for Scientific Applications", Lincoln Laboratory, Massachusetts Institute of Technology, Lexington, MA, Kevli Institute for Astrophysics and Space Research, Massachusetts Institute of Technology, Cambridge, MA, Proc. Of SPIE vol. 6690, 2008.

\* cited by examiner

OPTICAL READER HAVING IMPROVED BACK-ILLUMINATED IMAGE SENSOR

FIELD OF THE INVENTION

The present invention relates to indicia reading devices, and more particularly to an optical reader having an improved back-illuminated image sensor.

BACKGROUND

Indicia reading devices (also referred to as scanners, image reader, indicia readers, etc.) typically read data represented by printed or displayed information bearing indicia (IBI), (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Optical indicia reading devices typically utilize visible or infrared light. Laser indicia reading devices typically utilize transmitted laser light.

One-dimensional (1D) optical bar code readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a remote computer.

Some data collection devices, such as hand-held optical readers, are capable of capturing images as well as reading barcodes. The reading and decoding of a barcode represents an operation distinct from that involved in capturing an image. The reading and decoding of a bar code involves the imaging and then decoding of a one or two dimensional graphic symbol into the alphanumeric, full ASCII or other data sequence encoded by the symbol. The capturing of an image involves storing an electronic visual copy/representation of the image.

Efforts regarding such systems have led to continuing developments to improve their versatility, practicality and efficiency.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to reading or extracting data from an information bearing indicia (or symbol). The term imaging used herein refers to the taking or creation of an electronic image.

Figure 1:
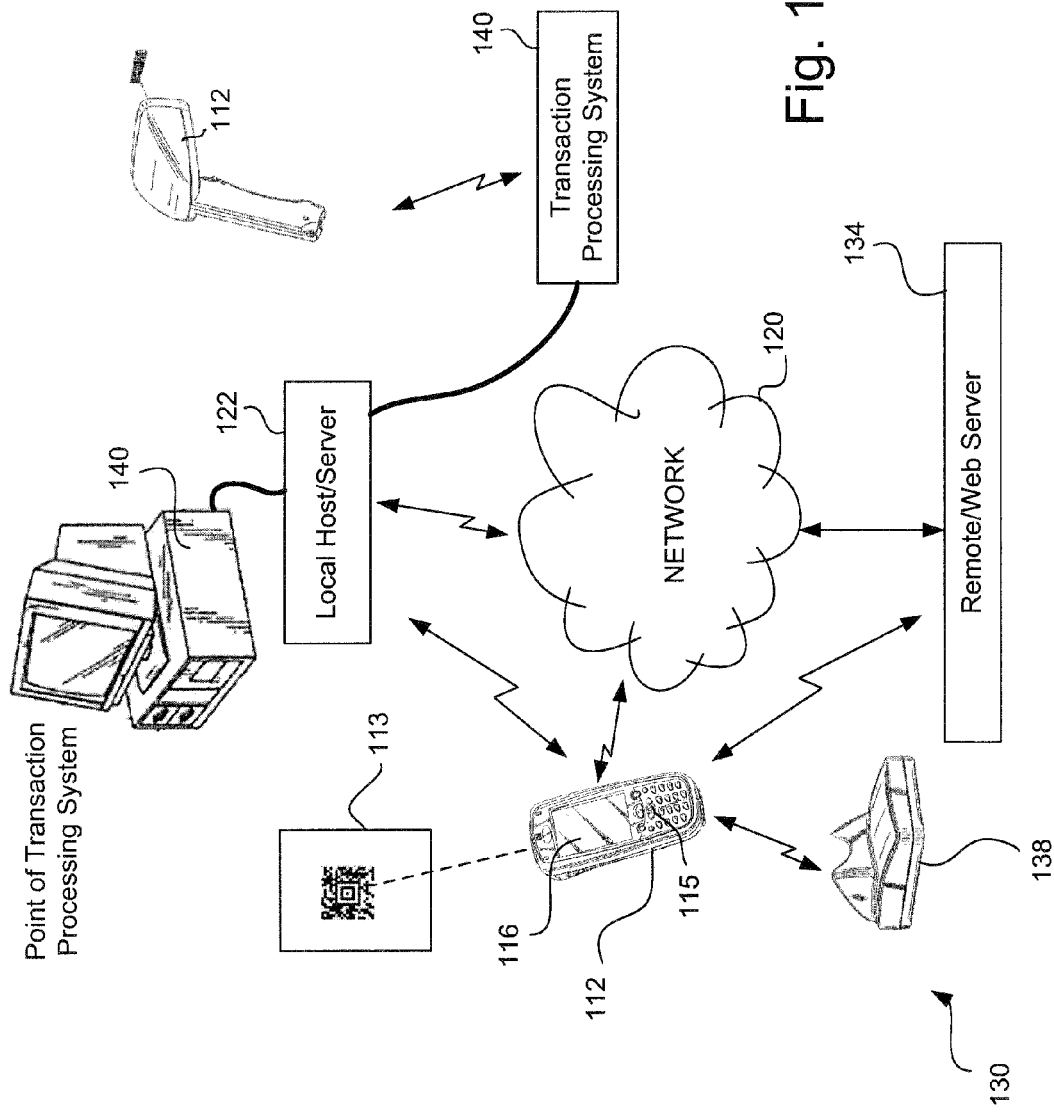
FIG. 1 is a block diagram of an exemplary optical reader system.
Figure 2:
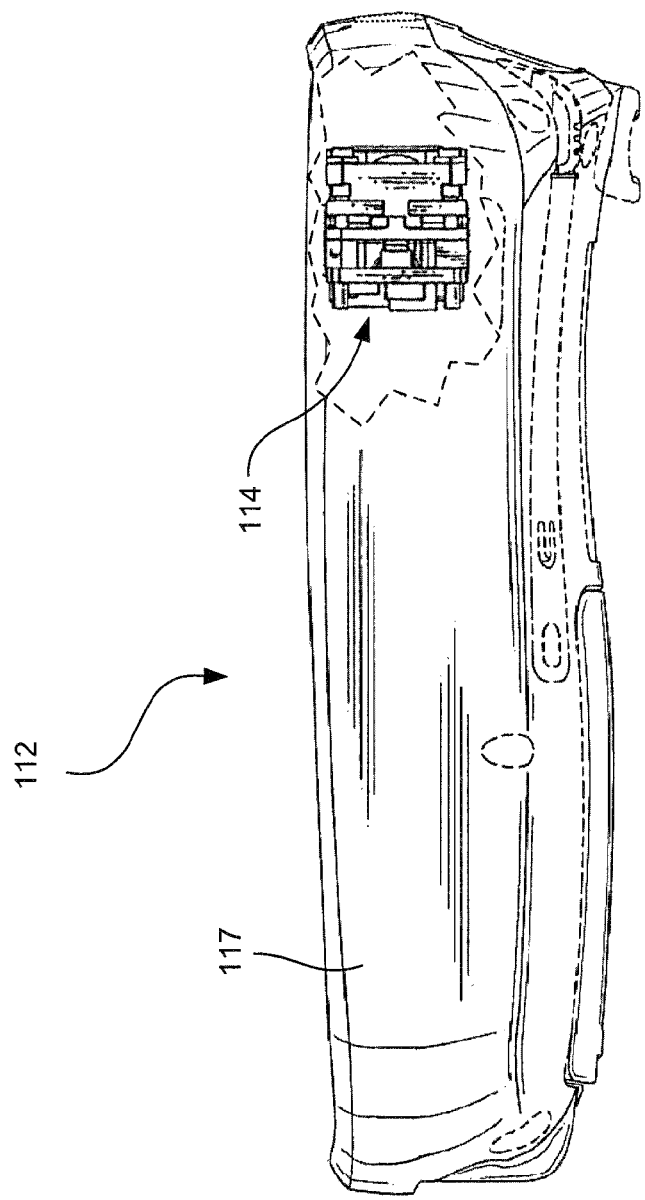
FIG. 2 is a fragmentary partially cutaway side view of an exemplary optical reader.
Figure 3:
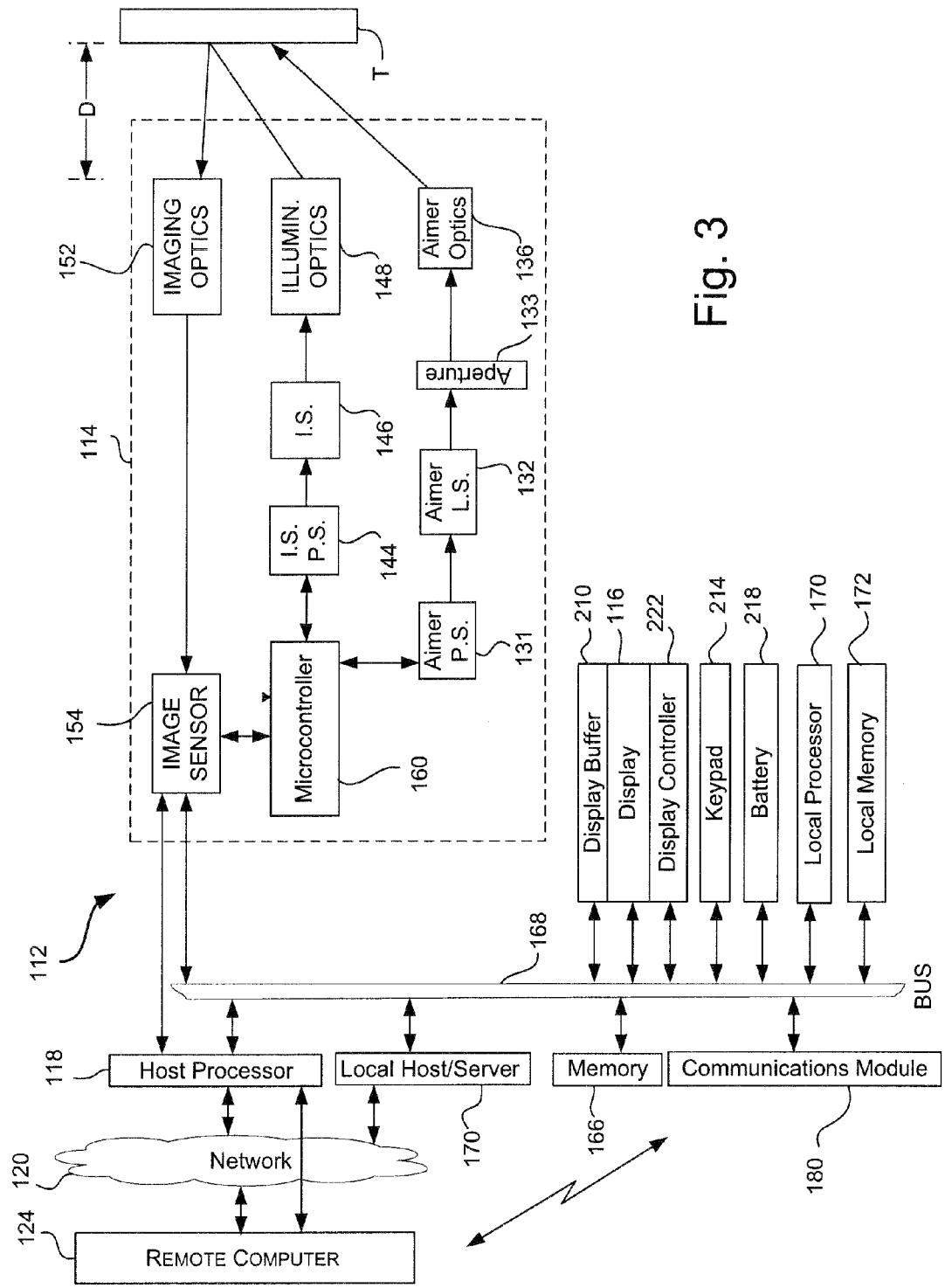
FIG. 3 is a block schematic diagram of an exemplary optical reader.

FIG. 1 illustrates an exemplary scanning system configuration, wherein a plurality of optical readers 112 are being operated or utilized in an establishment or facility, such as a retail store.

A human operator may aim a hand-held optical reader 112 having an indicia reader 114 at a target containing an information bearing indicia (IBI) 113 or dataform, text, or other element and actuate a trigger 115 on the optical reader. An IBI or dataform may be an originally machine generated symbology that is also machine readable, such as a 1-D barcode, a 2-D barcode, a 1-D stacked barcode, a logo, glyphs, color-codes, and the like.

When using an embodiment of an optical reader, a human operator may intuitively point the optical reader directly at the data to be collected, regardless of its type, and actuate a trigger.

An exemplary optical reader 112 may be a mobile device, such as a hand held scanner, a portable data terminal (PDT), personal digital assistant (PDA), mobile phone, etc. A Portable Data Terminal, or PDT, is typically an electronic device that is used to enter or retrieve data via wireless transmission (WLAN or WWAN) and may also serve as an indicia reader used in stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, and use as a spreadsheet. The optical reader may have a display 116.

An exemplary optical reader has an back-illuminated image sensor which digitizes a representative image seen in an imaging field of view. The optical readers may be in communication (wired or wireless) to a local transaction processing system 140, such as a cash register, customer station or employee station. The transaction processing systems 140 may be at a point of transaction (POT) or sale and may be in communication (wired or wireless) with a local server 122. The local server 122 may be in communication with network 120 and or a remote/web server 134.

An exemplary optical reader 112 may have a number of subsystems for capturing and reading images, some of which may have symbol indicia provided therein or thereon. Optical reader 112 may have an indicia reader assembly 114 provided within a head portion of a housing 117 which may be configured to be hand held by an operator. A trigger 115 may be used to control operation of the indicia reader 112. Indicia reader assembly 114 has imaging receive optics 152 having an optical axis (OA) for receiving light reflected from a target T and directing or projecting the reflected light from the target T to an back-illuminated image sensor 154. The optical axis is a line of symmetry through the imaging optics.

The receive optics 152 has a focal point wherein parallel rays of light coming from infinity converge at the focal point. If the focal point is coincident with the back-illuminated image sensor, the target (at infinity) is "in focus". A target T is said to be in focus if light from target points are converged about as well as desirable at the back-illuminated image sensor. Conversely, it is out of focus if light is not well converged. "Focusing" is the procedure of adjusting the distance between the receive optics and the back-illuminated image sensor to cause the target T to be approximately in focus. The target may be any object or substrate and may bear a 1D or 2D bar code symbol or text or other machine readable indicia.

Figure 4:
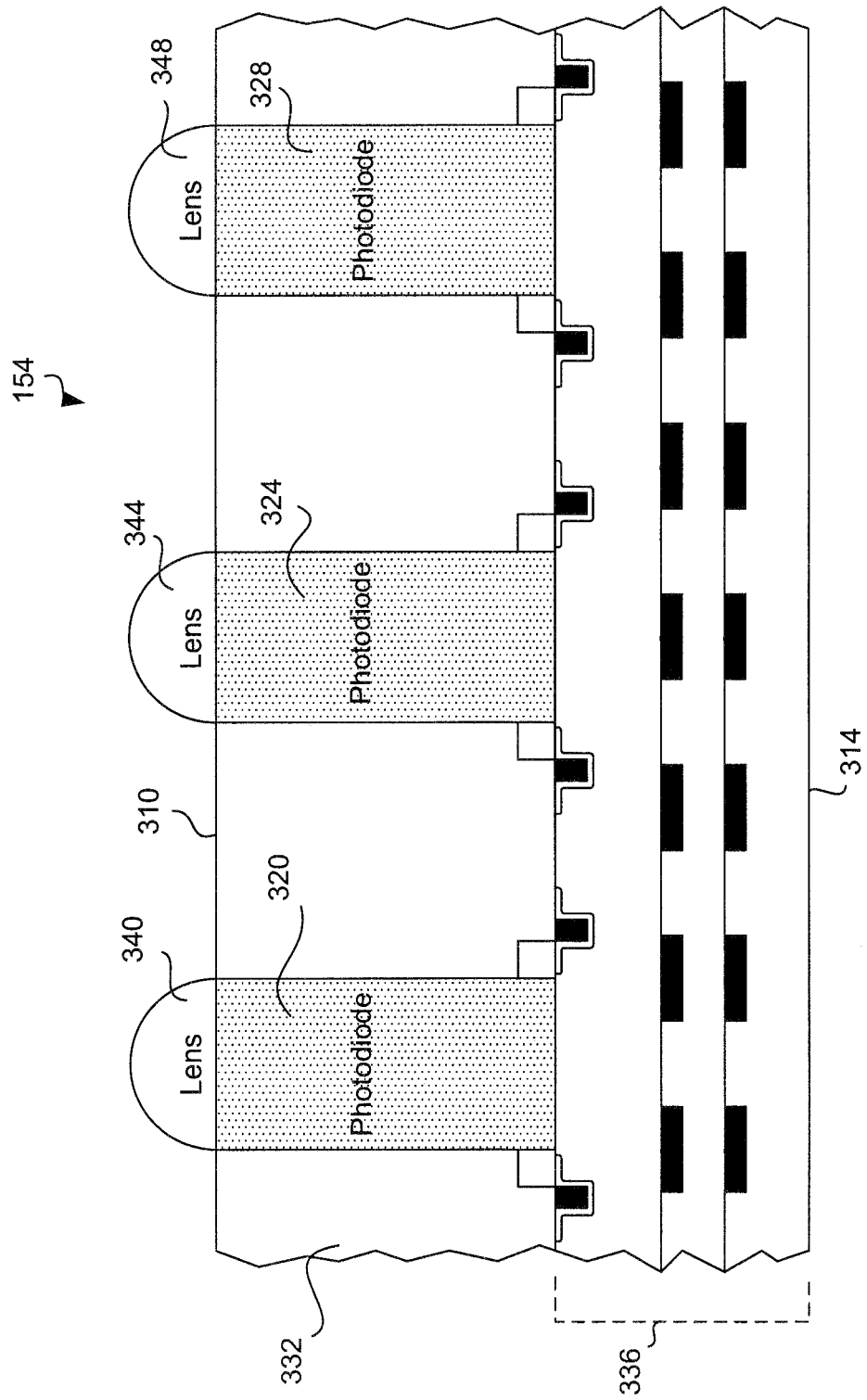
FIG. 4 illustrates a back-illuminated image senor.

An exemplary back-illuminated image sensor 154 may be a back-illuminated sensor illustrated in FIG. 4. In a back-illuminated image sensor an incident light beam is irradiated to the back face 310 of a chip opposite to the other face or surface 314 of the chip on which electrodes and the like are disposed. The back-illuminated image sensor is provided with a light converting portion 320, 324, 328 for each pixel on the back face side of the chip, and it is provided with portions for processing signal charges (charge processing portions) in some way, such as an A/D converter and a signal storage portion on the surface side of the chip. If visible light is the incident beam, the pixels are photoelectric cells or photodiodes. The pixels may be arranged in a one or two-dimensional array, wherein the pixels may be adapted to operate in a rolling shutter, global shutter or full frame operating mode which is a color, monochrome or monocolor 2D CCD, CMOS, NMOS, PMOS, CID, CMD, etc. solid state back-illuminated image sensor. This sensor contains an array of light sensitive photodiodes (or pixels) that convert incident light energy into electric charge. Solid state back-illuminated image sensors allow regions of a full frame of image data to be addressed.

An exemplary back-illuminated image sensor 154 may have a first circuit layer 332 or tier of a silicon or compound semiconductor device and the second and subsequent tiers 336 contain silicon-on-insulator (SOI) based electronics. The back-illuminated image sensor may be operated with light directly incident on the photo detector without obscuration from pixel circuitry. A lens 340, 344, 348 may be associated with each light converting portion to facilitate light being directed appropriately through the light converting portion.

An exemplary single-wafer-based back-illuminated image sensor may be fabricated in silicon-on-insulator wafers by locating the photosensitive elements in a handle wafer.

Exemplary back-illuminated sensors are described in U.S. Patent Application Publication No. 20060255240 entitled BACK-ILLUMINATED IMAGE DEVICE and U.S. Patent Application Publication No. 20090224345 entitled BACK-ILLUMINATED IMAGE SENSOR USING BACK-ILLUMINATED PHOTODIODE AND METHOD OF MANUFACTURING THE SAME the entireties of which are hereby incorporated herein by reference.

In an electronic shutter operating mode known as a full frame (or global) shutter the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

The output of the back-illuminated image sensor may be processed utilizing one or more functions or algorithms to condition the signal appropriately for use in further processing downstream, including being digitized to provide a digitized image of target T. Digitizing or digitization may be representing an object, an image, or a signal (usually an analog signal) by a discrete set of its points or samples. The result is digital data called a "digital representation" or, more specifically, a "digital image", for the object, and "digital form", for the signal.

A microcontroller 160 may perform a number of processing functions and be located on board with other components, such as the back-illuminated image sensor. Microcontroller 160 may include a predetermined amount of memory for storing firmware and data. The firmware may be a software program or set of instructions embedded in or programmed on the microcontroller which provides the necessary instructions for how the microcontroller operates and communicates with other hardware. The firmware may be stored in the flash memory (ROM) of the microcontroller as a binary or digital image data file and may be erased and rewritten. The firmware may be considered "semi-permanent" since it remains the same unless it is updated. This firmware update or load may be handled by a device driver.

The components in reader 112 may be connected by one or more bus 168, data lines or other signal or data communication form.

A host processor 118 or a local/host server 170 may be utilized to perform a number of functional operation, which may involve the performance of a number of related steps, the particulars of which may be determined by or based upon certain configuration settings stored in memory 166. Some data may be stored in memory provided as part of the microcontroller 160.

An exemplary function of a processor 118, 170 may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies. Decoding is a term used to describe the interpretation of a machine readable code contained in an image projected on the back-illuminated image sensor 154. The code has data or information encoded therein.

Exemplary functions of a processor or processors 118, 170 may be to facilitate operation of the image capture function, decoding functions, and operator interface functions. Operating software may be utilized to operate the processor for such functions seemingly simultaneously or in a multitasking role.

Imaging reader assembly 112 may also have an aiming generator light source 132, aiming aperture 133, aiming optics 136, an illumination source(s) 146 and illumination optics 148 to create an aiming light pattern projected on or near the target which spans a portion of the receive optical system 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like. Generally, the aiming light source may comprise any light source which is sufficiently small or concise and bright to provide a desired illumination pattern at the target.

The light sources 132 may also be comprised of one or more laser diodes combined with laser collimation lens (not shown in these drawings) to focus the laser light to a spot generally forward of the scanning hear and approximately at the plane of the target T. This beam may then be imaged through a diffractive interference pattern generating element, such as a holographic element fabricated with a desired pattern.

Illumination and aiming light sources with different colors may be employed. For example, in one such embodiment the optical reader may include white and red LEDs, red and green LEDs, white, red, and green LEDs, or some other combination chosen in response to, for example, the color of the symbols most commonly imaged by the indicia reader. Different colored LEDs may be each alternatively pulsed at a level in accordance with an overall power budget.

Optical reader may include an illumination assembly for illuminating target area T which may include one or more power supplies 144, illumination sources 146 and illumination optics 148.

In an exemplary embodiment the illumination source may be a laser for reflecting laser light off the target. This may be referred to laser scanning wherein the reflected laser light is converted into signals reflected off an IBI into IBI signals representative of the converted light. An aiming pattern generator may not be necessary in such an embodiment if the illumination laser provides an aiming function in addition to an illumination function.

A communications module 180 provides a communication link from imaging reader 112 to other imaging readers or to other systems such as a server/remote processor 124.

An exemplary optical reader 112 may have a display 116 which may be controlled by a display controller 222 which stores display data in a display buffer 210.

An exemplary optical reader 112 may have a keypad 214 for facilitating control thereof.

A battery 218 may be used to provide power to the components of the optical reader.

The processor, memory and associated circuitry which performs or controls the exemplary image capture and decoding functions may be provided in the optical reader or on associated circuit boards which are located within the housing 117 of the optical reader 112.

Operation of the decoding, which may be executed in a user or factory selectable relationship to a scanning routine, may be governed by parameters which control the codes which are enabled for processing as a part of an autodiscrimination process, whether decoding is to be continuous or discontinuous, etc. Permitted combinations of scanning and decoding parameters together define the scanning-decoding relationships or modes which the reader will use. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader 112. In the continuous mode, the reader takes continuous image exposures seriatim and continuously decodes or attempts to decode some or all of these images. In the continuous mode exposure times and decoding times are limited.

Discontinuous mode is a mode wherein scanning and/or decoding stops or is interrupted and must have an actuation event, such as pulling of a trigger 115, to restart. An exemplary utilization of the reader in discontinuous mode is via hand held operation. While triggered, the image reader may expose images continuously and decode images continuously. Decoding stops once the image reader is no longer triggered. Exposing of images, however may continue. In the discontinuous mode, the exposure time, decoding time out limits and decoding aggressiveness may be increased more than those set for continuous mode. It is to be noted that the discontinuous mode is typically initiated because the operator knows a symbol is present. The decoder therefore may forego making a determination of the presence of a symbol because a symbol is presumed to be in the field of view. Discontinuous mode may provide longer range scanning than the continuous mode.

Switching between continuous and discontinuous modes may be accomplished by use of a trigger 115 located on the reader. For example, when the trigger is depressed by an operator the reader may operate in a discontinuous mode and when the trigger is released the reader may switch to continuous mode after a predetermined period of time. A scanning subroutine may specify an address buffer space or spaces in which scan data is stored and whether scanning is to be continuous or discontinuous. Another example of switching between continuous and discontinuous modes may be accomplished by symbology wherein switching between the modes depends on the type of symbology detected. The reader may stop attempting to decode a symbol after a predetermined time limit. The reader, may limit the type of symbols to decode when in the continuous mode.

The aiming pattern generator may be programmed to operate in either continuous or discontinuous modes.

In the continuous mode, the present device may be configured to automatically switch to a reduced power state if no symbol has been sensed for a period of time. Upon sensing of a symbol the scanner may then automatically switch back to the higher power state continuous mode. In this reduced power state the scanner may change from having the aimer and/or illumination light sources on for every scan to having either/or on for only some of the scans (e.g. every 2 or 3 or less scans). In this manner the system may still be in a position to sense the presence of a symbol, but will draw less current and also generate less internal heating. After sensing a symbol, the image reader may utilize aiming/illumination for every scan until another period of inactivity is sensed.

Mode changes may be accomplished by the host computer in response to an appropriate signal over either a direct connection or wireless connection to the scanner.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The described embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. An optical reading device for collecting and processing symbology data comprising:
   a back-illuminated image sensor for converting light reflected from an information bearing indicia (IBI) into output signals representative thereof;
   receive optics for directing light from a target to the back-illuminated image sensor; a processor for decoding the output signals;
   an illumination source for generating illumination light illuminating the target and illumination optics for directing the illumination light onto the target;
   a housing encompassing the back-illuminated image sensor, receive optics and illumination source adapted for hand held operation
   wherein an incident light beam is irradiated to a back face of a chip opposite to another face or surface of the chip on which electrodes are disposed and the back-illuminated image sensor comprises a light converting portion for each pixel on the back face side of the chip, and is provided with portions for processing signal charges.

2. An optical reading device in accordance with claim 1, wherein the back-illuminated image sensor is at least one of the following: color; monochrome; monocolor; 2D; CCD; CMOS; NMOS; PMOS; CID and CMD.

3. An optical reading device in accordance with claim 1, wherein a focal point of the receive optics is at infinity.

4. An optical reading device in accordance with claim 1, wherein the IBI is a printed or displayed symbology.

5. An optical reading device in accordance with claim 1, wherein the back-illuminated image sensor is operated in the at least one of the following modes:
   rolling shutter; global shutter and full frame operating mode.

6. An optical reading device in accordance with claim 1, further comprising an aiming generator light source for creating an aiming light pattern on the IBI.

7. An optical reading device in accordance with claim 1, wherein the back-illuminated image sensor has a first circuit layer or tier of a silicon or compound semiconductor device and a second and subsequent tiers having silicon-on-insulator (SOI) based electronics, wherein the back-illuminated image sensor is adapted to be operated with light directly incident on a photo detector without obscuration from pixel circuitry, and wherein a lens is adapted to be associated with each light converting portion to facilitate light being directed appropriately through the light converting portion.

8. An optical reading device in accordance with claim 1, wherein the back-illuminated image sensor comprises a single-wafer-based fabricated in silicon-on-insulator wafers by locating photosensitive elements in a handle wafer.

* * * * *